US010145939B2

(12) United States Patent
Backstrom (10) Patent No.: US 10,145,939 B2
(45) Date of Patent: Dec. 4, 2018

(54) RECURSIVE MULTI-MODEL ECHO CURVE SIMULATION

(71) Applicant: Honeywell International Inc., Morris Plains, NJ (US)

(72) Inventor: Johan Backstrom, Vancouver (CA)

(73) Assignee: Honeywell International Inc., Morris Plains, NJ (US)

( * ) Notice: Subject to any disclaimer, the term of this patent is extended or adjusted under 35 U.S.C. 154(b) by 342 days.

(21) Appl. No.: 15/053,648

(22) Filed: Feb. 25, 2016

(65) Prior Publication Data

US 2017/0248690 A1    Aug. 31, 2017

(51) Int. Cl.
  *G01S 13/88*    (2006.01)
  *G01S 7/40*    (2006.01)
  *G01F 23/284*    (2006.01)

(52) U.S. Cl.
  CPC .......... *G01S 7/4052* (2013.01); *G01F 23/284* (2013.01); *G01S 13/88* (2013.01)

(58) Field of Classification Search
  CPC ............... G01F 23/284; G01F 23/2962; G01F 23/0076; G01F 23/28; G01F 25/0061; G01S 7/4052; G01S 13/88; G01S 13/08; G01S 13/70; G01S 13/882; G01S 15/88; G01S 7/292; G01S 7/2923; G01S 7/2927; G01S 7/412
  USPC ......................................................... 342/169
  See application file for complete search history.

(56) References Cited

U.S. PATENT DOCUMENTS

| 9,163,971 | B2 | 10/2015 | Welle et al. |
| 2009/0282892 | A1 | 11/2009 | Sai |
| 2010/0017174 | A1* | 1/2010 | Lyon ..................... G01F 23/284 703/2 |
| 2011/0094299 | A1* | 4/2011 | Muller ................ G01F 23/0076 73/290 V |
| 2012/0130509 | A1 | 5/2012 | Altendorf et al. |
| 2013/0096851 | A1* | 4/2013 | Hoferer ................. G01F 23/284 702/55 |
| 2013/0118251 | A1* | 5/2013 | Welle .................... G01F 23/284 73/290 R |

(Continued)

FOREIGN PATENT DOCUMENTS

| EP | 2148218 A1 | 1/2010 |
| WO | 2007097688 A1 | 8/2007 |
| WO | 2015112387 A1 | 7/2015 |

*Primary Examiner* — Timothy Pham
(74) *Attorney, Agent, or Firm* — Anthony Miologos (57) ABSTRACT

A method of simulating a pulsed radar gauge (PRG) on a tank. Provided are (i) a parametrized model of an echo reflection responsive to a transmitted radar pulse defined by an initial spatial model function, a first signal model modeling the pulse traveling through the media, and a second signal model modeling reflection and transmission of the pulse striking boundaries involving the media, and an (ii) echo curve calculation (ECC) program. The ECC program divides the signal path into path components for the pulse using the first and second signal model together as a recursive program with stop conditions to indicate an end result for the path components when taken together for reflected signals reaching the transceiver include locations of reflections and respective amplitudes. A shape of the initial model is placed at reflection locations using their respective amplitudes applied to size their amplitude to generate a simulated echo curve.

19 Claims, 8 Drawing Sheets

(56) References Cited

U.S. PATENT DOCUMENTS

| | | | |
|---|---|---|---|
| 2014/0210488 A1* | 7/2014 | Weber | G01F 23/284 |
| | | | 324/644 |
| 2015/0204712 A1* | 7/2015 | Krolak | G01F 25/0061 |
| | | | 702/94 |
| 2016/0103008 A1* | 4/2016 | Edvardsson | G01S 13/88 |
| | | | 342/124 |

* cited by examiner

RECURSIVE MULTI-MODEL ECHO CURVE SIMULATION

FIELD

Disclosed embodiments relate to the simulation of echo curves generated by pulsed radar level gauges.

BACKGROUND

Industrial plants having containers or tanks ("tanks") generally need to regularly measure the level of liquid(s) or other materials therein such as powders. There are several types of systems and techniques used for level measurement, which generally utilize time domain reflectometry (TDR) which relies on analyzing echoes.

For TDR-based measurements, there are contact level measurements, where a part of the system, such as a probe, contacts the material being measured, and non-contact level measurements where the level is measured with a probe without contacting the material to be measured. Non-contact methods include ultrasound which uses high-frequency sonic (sound) waves to detect the level, and radar which uses electromagnetic energy at radio frequencies which propagate through free-space.

Guided wave radar (GWR) is a particular contact pulsed radar method used to measure the level of liquids or solids in a tank. GWR works by generating a stream of pulses of electromagnetic energy and propagating the pulses down a transmission line formed into a level sensing probe, such as a coaxial probe. The probe is generally placed vertically in a tank or other container and the electromagnetic pulse is launched downward from the top of the probe. The probe is open to both the air and the material(s) to be sensed in such a way that the electromagnetic fields of the propagating pulse penetrate the air (or other gas, liquid or perhaps a solid) until they reach the level of the product material. At that point, the electromagnetic fields see the higher dielectric constant of the product material. This higher dielectric constant causes a reduction in the impedance of the transmission line, resulting in a pulse echo being reflected back to the top of the probe. The pulse travels through the generally air dielectric portion of the probe above the product material at a known velocity. Knowing both the return trip time of the radar pulse and the dielectric constant of the materials through which the radar pulse propagates allows the material level(s) on the probe to be determined.

An echo curve includes a plurality of different peaks, where each peak of the echo curve corresponds to a reflection of the radar signal at discontinuities caused by a transition between two media (e.g. from the surface of the level or interface, an obstacle, or something else). A reference pulse is one peak caused by the transition between transmitter head and the probe or an impedance transition inside the transmitter head. A reflection at the product surface(s) as described above causes further a further peak(s).

Besides their usual operating mode which is based on echo curves obtained from actual measurements, GWR systems generally also provide a simulation mode that can be used to simulate radar measurements and alarms. One application for echo curve simulation is when installing a pulsed radar level gauge on a tank for the first time or when troubleshooting an existing pulsed radar level gauge installation. In such applications, software-based field setup tools are typically used as a setup aid.

These set-up tools are used to program the pulsed radar level gauge with such input parameters as waveguide length, process connector characteristic(s), tank nozzle dimensions (for tanks having nozzles), product material(s) in the tank (their dielectric constants and expected tank disturbances (e.g., foam, turbulence). In addition to setting up the pulsed radar level gauge and application parameters, the set-up tool is generally also used to collect and display actual echo curves received responsive to transmitted radar pulses. Such displayed actual echo curves are then used by the operator (e.g., technician or engineer) to judge whether the pulsed radar level gauge has been set-up and is operating as expected.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include recursive multi-model echo simulation algorithms for simulating echo curves generated by a pulse radar gauge (PRG) that includes a transceiver coupled by a process connection to a probe installed on a tank having at least one product material therein. Provided is an echo simulation algorithm including (i) a parametrized model of an echo reflection responsive to a transmitted radar pulse launched into the tank defined by an initial spatial model function with function parameters including a signal amplitude as a function of distance, a width and a spatial attenuation, a first signal model comprising a damping factor modeling the radar pulse traveling through each media in its signal path, and a second signal model modeling a magnitude of a transmission and a reflection of the radar pulse striking boundaries involving the media (media boundaries), and ii) an echo curve calculation (ECC) program.

Using a processor running the ECC program, the ECC program divides the signal path into a plurality of signal path components for the transmitted radar pulse using the first signal model together with the second signal model as a recursive executing program with stop conditions, which whenever one of the stop conditions is reached provides an end result for ones of the signal path components that taken together for reflected signals reaching the transceiver include locations of reflections and their respective amplitudes. A shape of the initial spatial model function is placed at each of the locations of reflections using the respective amplitudes applied to size their amplitude to generate a simulated echo curve.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Figure 1:
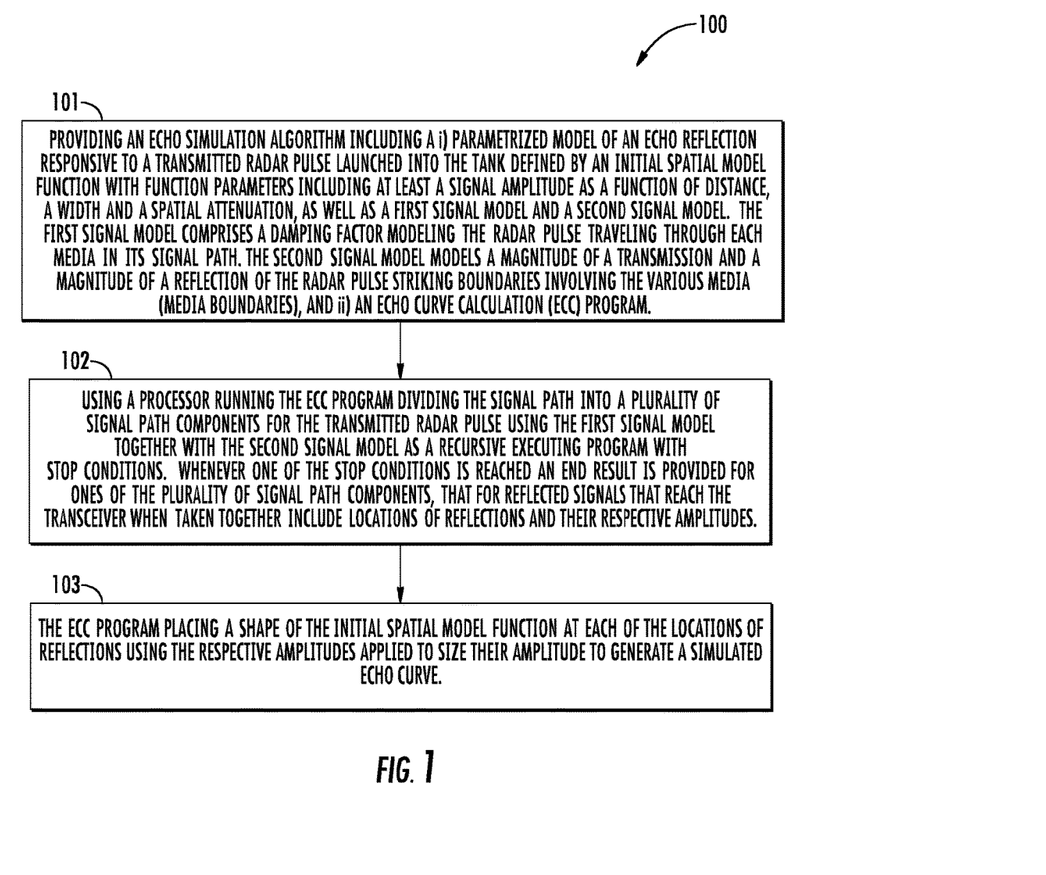
FIG. 1 is a flow chart that shows steps in an example method of recursive multi-model echo curve simulation for simulating pulse echo curves generated by a PRG that includes a transceiver coupled by a process connection to a probe installed on a tank having at least one product material therein, according to an example embodiment.

FIG. 1 is a flow chart that shows steps in an example method 100 of modeling simulated pulse echo curves generated by a PRG that includes a transceiver coupled by a process connection to a probe installed on a tank having at least one product material therein, according to an example embodiment. Step 101 comprises providing an echo simulation algorithm including (i) a parametrized model of an echo reflection responsive to a transmitted radar pulse launched into the tank defined by an initial spatial model function (initial function) with function parameters including at least a signal amplitude as a function of distance, a width and a spatial attenuation, as well as a first signal model and a second signal model. The first signal model comprises a damping factor modeling the radar pulse traveling through each media in its signal path (from the transceiver board through the process connector, the flange (if present), tank contents to the end of the probe). The second signal model models a magnitude of a transmission and a magnitude of a reflection of the radar pulse striking boundaries involving the various media (media boundaries). The echo simulation algorithm also includes ii) an echo curve calculation (ECC) program.

Model input parameters are also provided for disclosed recursive multi-model echo simulation algorithms. Such model inputs are conventional simulation input parameters described above in the background as the waveguide length, process connector characteristic(s), tank nozzle dimensions (for tanks having nozzles), product material(s) in the tank (their dielectric constants, and thicknesses), and expected tank disturbances (e.g., foam, turbulence). Such model inputs parameters are provided by the user, except the distance to product(s) can be alternatively generated by the simulation software, and the user can for example provide inputs including a maximum level, minimum level, and rate of change, and the simulation software can simulate the level moving up and down and generate the corresponding echo curves.

Within the tank is at least a vapor, at least one product that can be a vapor, typically two different products, and possibly ≥2 products in the tank. One typically arrangement is oil on water. The transmitted signal path is from the transceiver PCB through the process connector, flange (if present), tank contents (product(s) to the end of the probe which is modeled as a perfect reflector. As used herein a "media" is defined as anything in the signal path of the pulsed radar that scatters the radar pulse, including the process connector, flange (if present), tank contents (product material(s)), and the probe.

The initial function can comprise a damped sine function, a damped cosine function, or a Gaussian function, for example, each shown below.

A Damped Cosine $$p(x) = g(x)e^{-a\left(\frac{x-c}{w}\right)^2}\cos\left(\frac{\pi(x-c)}{w}\right)$$

A Damped Sine $$p(x) = g(x)e^{-a\left(\frac{x-c}{w}\right)^2}\sin\left(\frac{\pi(x-c)}{w}\right)$$

A Gaussian $$p(x) = g(x)e^{-0.5\left(\frac{x-c}{w}\right)^2}$$

Where p(x) is the radar pulse as a function of distance (x), g(x) is a gain/amplitude parameter as a function of distance (x), α is a spatial attenuation parameter which determines the rate the reflection signal dies out, w is a width parameter, and c is a center coordinate. Thus w determines the width of the reflection and is generally very close to the width of one of the main lobes at zero magnitude. Although a constant for the width (w) and spatial attenuation (a) can be used, the initial function can also account for one or both of the width (w) and spatial attenuation (a) being a function of the distance (x). For example, the first model can account for a shape change as the radar pulse is travelling through a media, such as widening of the width (w) of the radar pulse as the signals travels through a media. For example, w can be a linear function of the distance: $w(x)=k^*x+w_0$.

Regarding the first signal model for the radar pulse traveling through a media, as the radar pulse travels through the media it loses energy to the media. This attenuation can be modelled as a simple exponential decay in the gain/amplitude parameter g(x):

$$g_{k+1} = e^{-\alpha \Delta x} g_k$$

where α is a linear attenuation parameter, Δx is the distance travelled through the media, $g_k$ and $g_{k+1}$ are the gain/amplitude before and after traveling through the media. The second signal model is for modeling the transmission and reflection at the various media boundaries. The media boundaries can be modelled using the following Fresnel equations which are functions of the dielectric constant (DC) on the respective sides of the media boundary:

$$a_r = \frac{\sqrt{DC_1} - \sqrt{DC_2}}{\sqrt{DC_1} + \sqrt{DC_2}}, g_r(x) = a_r g_i(x)$$

$$a_t = \frac{2\sqrt{DC_1}}{\sqrt{DC_1} + \sqrt{DC_2}}, g_t(x) = a_t g_i(x)$$

where $\alpha_r$ is the reflection factor, $\alpha_t$ is the transmission factor, $g_i$ is the gain of the incident signal, $g_r$ is the gain of the reflected signal, and $g_t$ is the gain of the transmitted signal. $DC_1$ is the dielectric constant of the first media and $DC_2$ is the dielectric constant of the second media in the direction of travel of the radar pulse. The reflection factor $a_r$ and transmission factor $a_t$ being amplitude ratios related by $1+a_r=a_t$.

Step 102 comprises using a processor running the ECC program, dividing the signal path into a plurality of signal path components for the transmitted radar pulse (see FIG. 2 described below) using the first signal model together with the second signal model as a recursive executing program with stop conditions. Whenever one of the stop conditions is reached an end result is provided for ones of the plurality of signal path components, that when taken together for reflected signals reaching the transceiver include locations of reflections and their respective amplitudes. The processor can be microprocessor, digital signal processor (DSP), or microcontroller unit (MCU). Step 103 comprises the ECC program placing a shape of the initial function at each of the locations of reflections using the respective amplitudes applied to size their amplitude to generate a simulated echo curve.

Disclosed recursive multi-model echo simulation algorithms more efficiently simulate the echo curve unlike known simulation methods such as based on ABCD matrix theory from optics, which is relatively computationally expensive. The ABCD method uses a Fourier transform, followed by simulation operations in the frequency domain, and then applying the inverse Fourier transform to return to the time domain.

Figure 2:
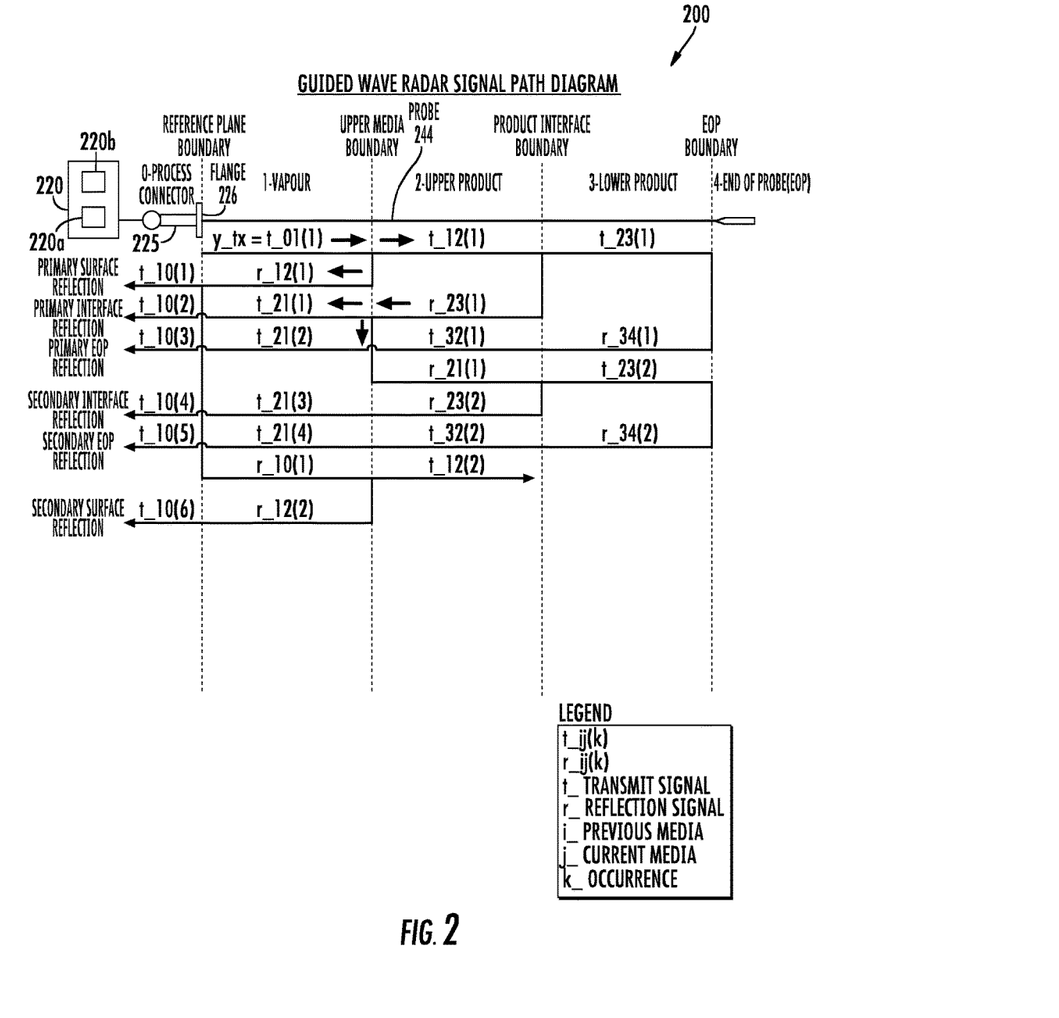
FIG. 2 depicts an example GWR echo curve signal path diagram showing the GWR signal path as various tree branches which represent the signal path components for a tank condition having an upper product on a lower product, according to an example embodiment.

FIG. 2 depicts an example GWR echo curve signal path diagram 200 showing the GWR signal path as various tree branches which represent the signal path components for a tank condition having an upper product 2 on a lower product 3, according to an example embodiment. A vapour 1 is shown above the upper product 2. A transmitter 220a shown as part of a transceiver 220 that also includes a receiver 220b as the same unit generally transmits the radar pulse and receives the radar pulse (see transceiver 220 as part of PRG 250 in FIG. 4 described below) is shown coupled to the tank 205 by a process connector 225 such as a coaxial connector which is coupled to a probe (or waveguide) 244. The process connector 225 provides the functions of separating the process environment from the external environment, providing a threaded insert to the tank which removes the need for brackets to mount the transmitter, and providing an electrical feed-through to the probe 244.

The signal path is shown to begin at the process connector 225, such as a coaxial connector, although the signal starts earlier at the transmitter 220a. A flange 226 is shown on the top of the tank. There are primary reflection paths originating from each of the boundaries shown, and secondary reflection paths shown as well. The media boundaries shown are a reference plane boundary (between the flange 226 and the vapour 1), an upper media boundary, product interface boundary, and end of probe (EOP).

Figure 3:
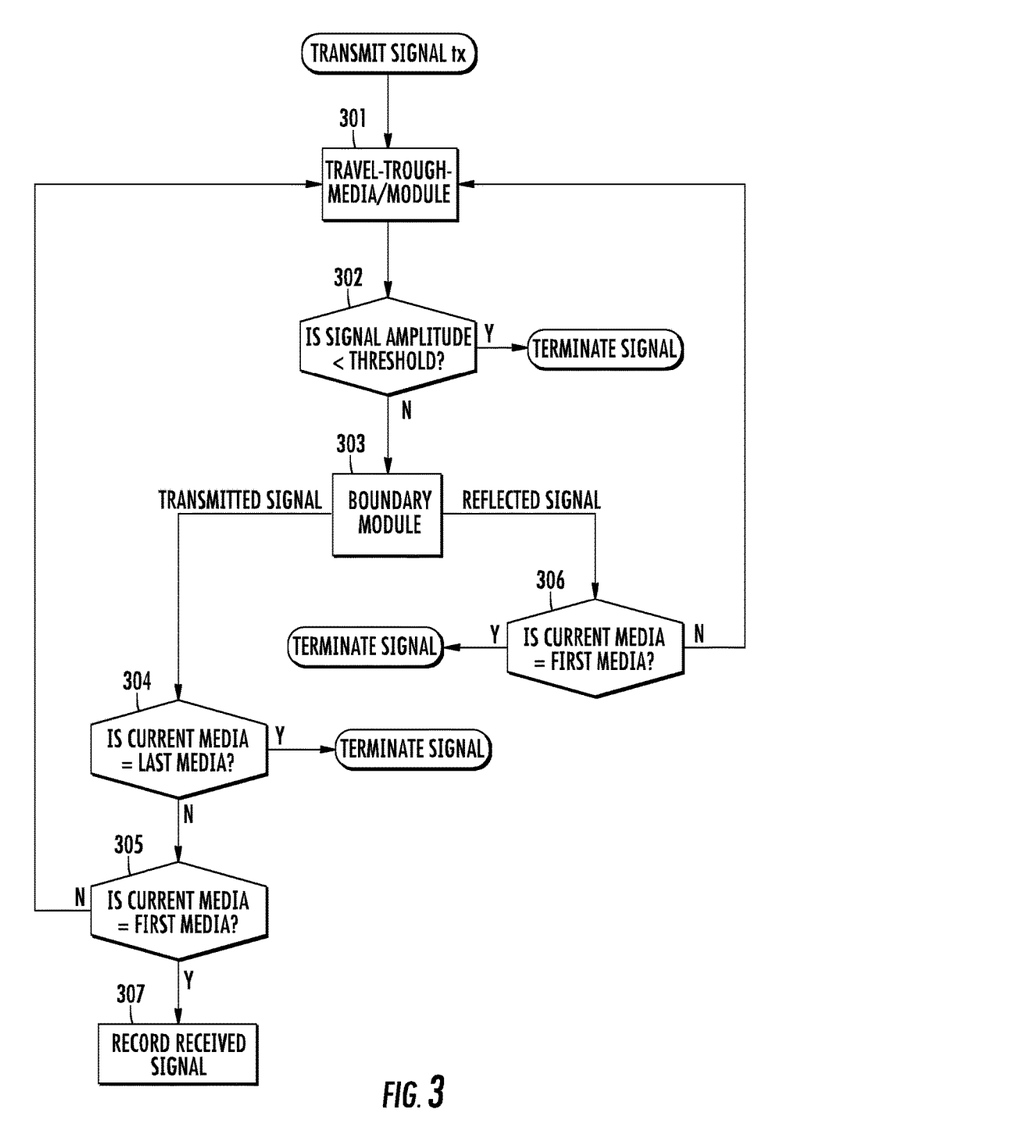
FIG. 3 is a flow chart including blocks that shows steps in an example method of recursive multi-model echo curve simulation for simulating pulse echo curves generated by a PRG, along with stop conditions, according to an example embodiment.

Only primary and secondary boundary reflections are shown with FIG. 2, and all impedance transitions in the transmitter 220a are omitted for clarity. Disclosed methods do not have this 2 boundary maximum limitation, but instead have a related limitation using a threshold signal amplitude after applying the first signal model to decide whether to terminate consideration of the signal, as shown in FIG. 3 described below. FIG. 2 also includes a legend defining the signal format shown.

The transmitted pulse radar signal tx from the transmitter 220a is shown first incident at the upper media boundary, where a portion of the signal is transmitted as t_12(1) and a portion reflected as r_12(1) which is received by the receiver 220b as a primary surface reflection (t_10(1)). t_12(1) is incident on the product interface boundary resulting in a transmitted portion t_23(1) and a reflected portion r_23(1). r_23(1) is shown received by the receiver 220b as a primary interface reflection (t_10(2)). t_23(1) is received by the receiver 220b as a primary EOP reflection (t_10(3)). Similarly, r_23(1) reflected at the upper media boundary results in the receiver 220*b* receiving a secondary interface reflection (t_10(4)), secondary EOP reflection (t_10(5)), and secondary surface reflection (t_10(6)).

FIG. 3 is a flow chart including blocks that the shows steps in an example method of recursive multi-model echo curve simulation for simulating pulse echo curves generated by a PRG, along with stop conditions, including the recursive aspect being shown between the first signal model and second signal model, according to an example embodiment. As noted above, the method utilizes input parameters (generally provided by the user) including the waveguide/probe length, process connector characteristic, tank nozzle dimensions (for tanks having nozzles), product material(s) in the tank (their dielectric constants, and thicknesses), and expected tank disturbances (e.g., foam, turbulence).

The transmitted pulse radar signal tx first arrives at block 301 shown as a travel-through media module (implementing the first signal model). The signal then arrives at block 302 which is a decision block which compares the signal amplitude to a signal amplitude threshold. For example, the signal threshold may be set at 500 counts for an initial signal amplitude of 12,000 counts. If the signal amplitude is <the signal amplitude threshold, the signal is terminated (functioning as a stop condition) where an end result for that specific signal path component is discarded as the signal essentially physically dies out due to its energy losses If the signal amplitude is ≥the signal amplitude threshold, the method continues to block 303 shown as a boundary module (implementing the second signal model). The signal energy is split by block 303 into a transmitted signal and a reflected signal by the boundary module. The transmitted signal reaches decision block 304 where the current media is compared to the last media (end of probe (EOP), where the transmission ends as the EOP is a perfect reflector, 100% of the signal being reflected back at EOP.) If the current media is the last media, the signal is terminated.

If the current media is not the last media, the signal reaches a decision block 305 where the current media is compared to the first media shown as the process connector in simplified FIG. 2, but the first media is really the transmitter on the sensor board. If the current media is equal to the first media, the method reaches block 307 that functions as another stop condition where the received signal is recorded. The locations of the recorded reflections are the accumulated distance travelled divided by two. Each time the signal travels through a media of thickness dx, the travelled distance is updated as: x=x+dx. Since x and dx are in observed distances, dx is a function of the media thickness and the DC: dx_observed=dx_real*(DC)$^{1/2}$. Relating FIG. 3 to the example GWR echo curve signal path diagram 200 shown in FIG. 2, the received signal would comprise the primary surface reflection (t_10(1)) on one receipt, primary interface reflection (t_10(2)) on another signal receipt, etc.

In step 305 if the current media is not equal to the first media, the method reaches block 301 again where the signal (as modified by the first signal model and second signal model) arrives at block 301 and the above steps are repeated until the signal reaches one of the terminate signal (stop) conditions.

The reflected signal from block 303 modified by the boundary module reaches a decision block 306 where the current media is compared to the first media. If the current media is the first media, the signal is terminated. If the current media is not the first media, the signal (as modified by the first signal model and second signal mode) arrives at block 301 and the above steps are repeated until the signal reaches one of the terminate signal (stop) conditions.

The simulated echo curve can be generated by the PRG itself or by a set-up software tool which runs on a separate computing device such as a handheld device, laptop computer, tablet, etc. which could be communicably coupled (e.g., by a wire, cable or wireless connection) to the PRG. A common use case would also be to run the simulation in off-line mode, i.e. without connection to the GWR transmitter. The simulation can be run on a personal computer (PC) in a field service software application or in the cloud on a web application.

The simulated echo curve can be overlaid with an actual echo curve obtained by the PRG on a display of the PRG, or at the separate computing device when a separate computing device is utilized to generate the simulated echo curve, or at another display device (e.g., in a control room of the plant) coupled to receive the simulated echo curve and actual echo curve). Tank operators viewing the overlay can easily compare the simulated echo curve against the real (actual) echo curve captured by the PRG.

If the real echo curve displayed together with the simulated echo curve differs significantly (e.g., by a predetermined amount) from the simulated echo curve then the recursive multi-model echo simulation algorithm or the operator can make a judgment that the PRG has not been installed properly and/or is functioning improperly. In addition to being used to provide a visual aid to the operator, disclosed algorithms can also compare the simulated echo curves to the real (actual) echo curves to produce alarms or provide guidance to the operator through the set-up or diagnostic process for the pulsed radar gauge to reduce the "error" between the real echo curve and the simulated echo curve. Parameters or items that can be compared by disclosed recursive multi-model echo simulation algorithms include the amplitude, position, width or number of the reflection peaks resulting from echo curve influences such as the process connection, product material level in the tank, or the end of probe, and also the general shape of the echo curve.

The guidance for an operator can be provided through a set-up or diagnostic process for implementing change(s) to improve the performance of the PRG. For example, if the level peak was not present but the process connection feature was present, the guidance can suggest checking for something wrong with the process connection to the waveguide. If the amplitude of the refection from the level was lower or broader the guidance can suggest checking whether foam or turbulence is present. If there was an unpredicted peak present on the echo curve the guidance can suggest checking whether there is build-up of material (e.g., crude oil) on the probe or an unexpected interference from an obstacle in the tank.

Figure 4:
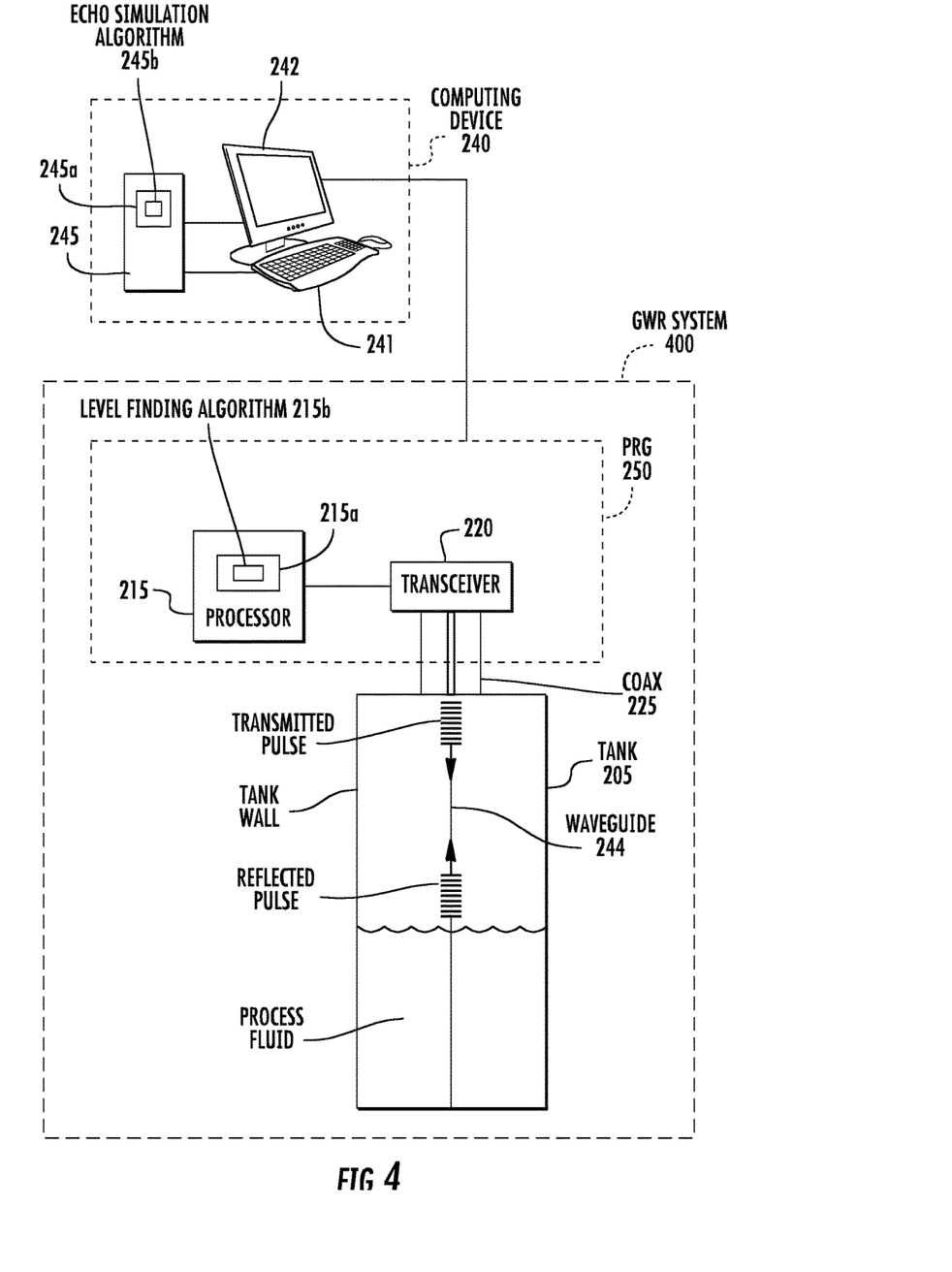
FIG. 4 depicts an example GWR system that includes a PRG, and a separate computing device including a disclosed recursive multi-model echo simulation algorithm shown implemented in software associated with its processor that runs the algorithm for providing a method of simulating pulse echo curves generated by the PRG, according to an example embodiment.

As noted above, instead of the PRG including a disclosed recursive multi-model echo simulation algorithm, an installer can hook up a separate computing device that runs troubleshooting software including a disclosed algorithm. FIG. 4 depicts an example GWR system 400 that includes a PRG 250, and a separate computing device 240 including a disclosed recursive multi-model echo simulation algorithm 245*b* shown implemented in software stored in an integral (on-chip) memory (e.g., flash memory) 245*a* associated with its processor 245 that runs the recursive multi-model echo simulation algorithm 245*b* for providing a recursive multi-model method of simulating pulse echo curves generated by the PRG 250, according to an example embodiment. As noted above, the echo simulation algorithm 245*b* includes the i) parametrized model of an echo reflection and the ii) ECC program. Computing device 240 can comprise a handheld device, a tablet, a laptop computer or a personal computer (PC). The computing device 240 as shown includes a keyboard 241 and a display 242.

The PRG 250 is shown including its own processor 215 and an integral (on-chip) memory 215a (e.g., flash memory) that stores a level finding algorithm 215b. Other (external) memory that can hold some constants and other data used by the level finding algorithm 215b. Computing device 240 is communicably coupled to the PRG 250 by a wire, cable or a wireless connection. This arrangement shown having the recursive multi-model echo simulation algorithm 245b being separate from the PRG 250 reflects a typical arrangement because the PRG 250 may not have sufficient processing power to perform the needed calculations and/or provide the necessary graphical user interface (GUI) to allow a tank installer to troubleshoot the system.

Display 242 can be used to display the simulated echo curve together with the actual echo curve obtained by the PRG 250. Computing device 240 can also generate an alarm (visual such as a blinking light, or an audio alarm) when the actual echo curve varies from the simulated echo curve by more than a predetermined amount, and provide guidance for an operator through a set-up and diagnostic process for the PRG 250.

The PRG 250 is also shown including a transceiver 220 providing a transmitter and a receiver that by the process connector shown as a coaxial connector (coax) 225' couples to the top of the tank 205. The transmitter and the receiver provided by transceiver 220 may be implemented as separate blocks. Accordingly, a "transceiver" as used herein includes both of these arrangements. A flange (not shown) may also be present at the top of the tank 205. The tank 205 may also include a nozzle. The probe (or waveguide) is shown as 244. As noted above, although generally described for GWR applications, disclosed level finding can also be applied to ultrasound and non-contacting radar.

Besides off-line use generally described above, disclosed methods can also be implemented in real-time. In this case, implementation is in a transmitter of the transceiver, and the method is used for online/real-time diagnostics.

EXAMPLES

Disclosed embodiments are further illustrated by the following specific Examples, which should not be construed as limiting the scope or content of this Disclosure in any way.

This Example involves a single product application where the media in the tank is water. The distance (vapor above the water) to the water product from the flange was 14 m. The probe length was 19 m, (so that the water was 5 m thick. The 25° C. the dielectric constant of water is known to be about 78.30. Other input parameters needed include the characteristics on the components making up the process connector. However, this information is generally proprietary information that is pre-programmed into the software application so that the user would not need to enter in these characteristics.

Figure 5:
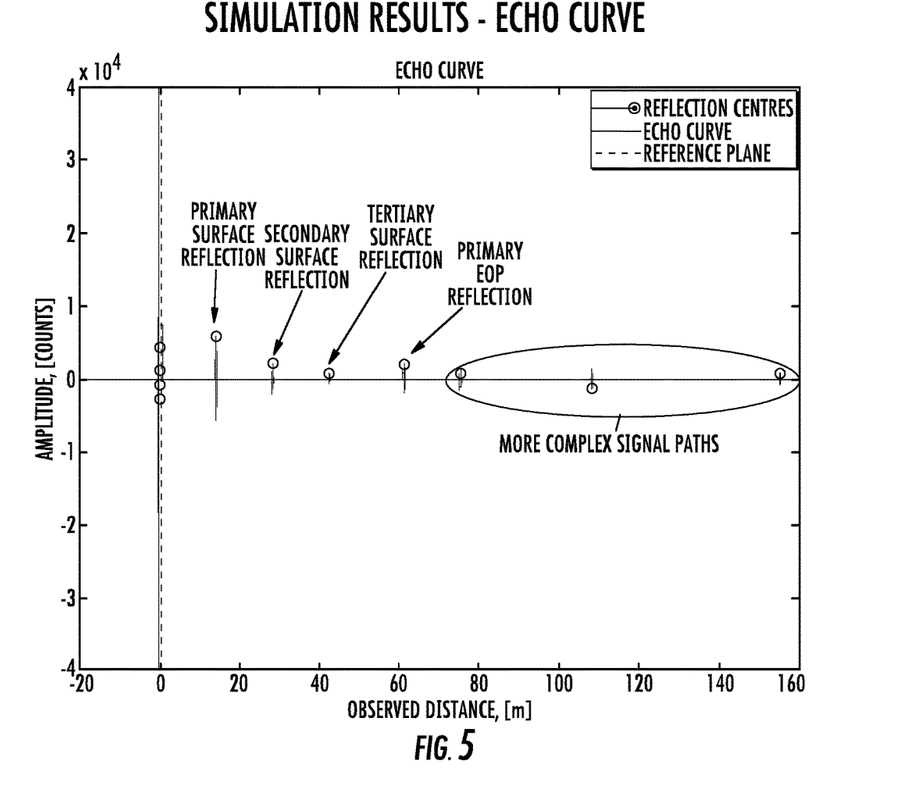
FIG. 5 shows an example echo curve simulation result showing echo curve amplitude as a function of observed distance in meters.

FIG. 5 shows an example echo curve simulation result showing echo curve amplitude as a function of observed distance in meters. A damped sine function was used for the initial spatial model function. The reference plane corresponds to the location of the flange (top of the tank). There are reflection centers shown corresponding to a primary surface reflection, secondary surface reflection, tertiary surface reflection, primary EOP reflection and some more complex signal path reflections. The initial spatial model function representing the reflected and received radar pulse is shown centered at each of the reflection centers. As expected the primary surface reflection corresponding to the upper media boundary in FIG. 2 has the largest amplitude. Observed distances >the probe length are the result of reflection(s).

Figure 6:
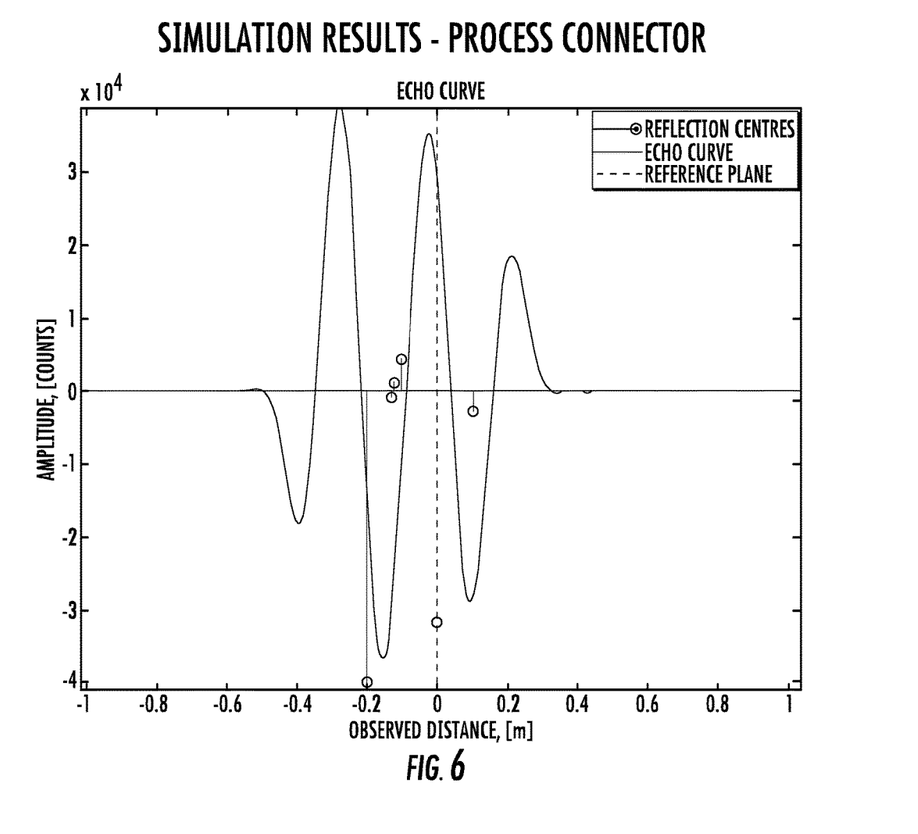
FIG. 6 shows an example echo curve simulation result showing the echo curve amplitude as a function of observed distance in meters around the process connector.

FIG. 6 shows an example echo curve simulation result showing the echo curve amplitude as a function of observed distance in meters around the process connector. This is an expanded scale around the reference plane in FIG. 5. The initial spatial model function is shown centered at each of the reflection centers. Each reflection is superposed (added up) to generate the final simulated echo curve.

Figure 7:
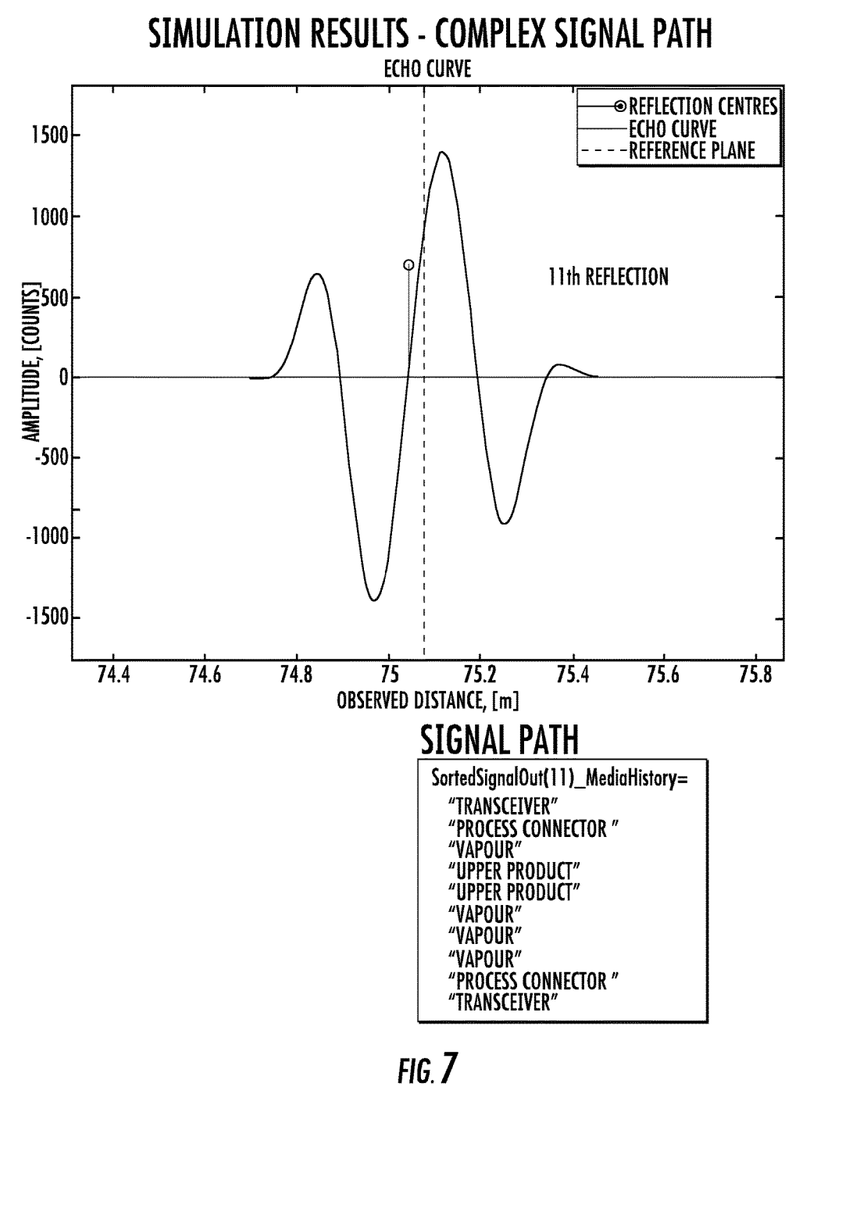
FIG. 7 shows an example echo curve simulation result showing the echo curve amplitude as a function of observed distance in meters around the 11$^{th}$ reflection centered at an observed distance of 75 m.

FIG. 7 shows an example echo curve simulation result showing the echo curve amplitude as a function of observed distance in meters around the $11^{th}$ reflection centered at an observed distance of 75 m. The signal path for the $11^{th}$ reflection is also shown which provides an understanding of this complex signal path. The media entries shown as the signal path lead to the $11^{th}$ reflection shown. In this case the signal travels through the upper product reflects in the EoP, travels back through the upper product, through the vapor, reflects in the process connector/flange, travels back through the vapor, reflects in the upper product, and travels back toward the process connector, transmits through the process connector and is recorded at the transceiver.

Figure 8:
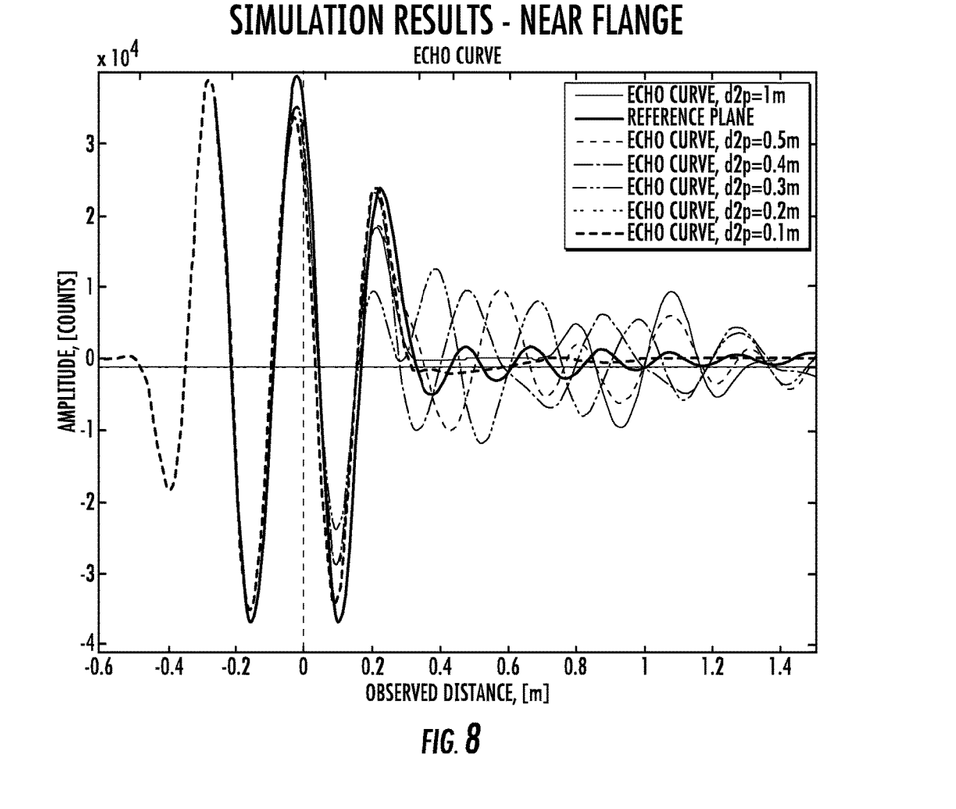
FIG. 8 shows an example echo curve simulation result showing the echo curve amplitude as a function of observed distance in meters for echo curves around the flange for different values of distance to product (d2p).

FIG. 8 shows an example echo curve simulation result showing the echo curve amplitude as a function of observed distance in meters for echo curves around the flange for different values of the distance to product shown as d2p. A reference plane is again shown. At 0.5 m from the reference plane, secondary reflections can be seen to start to mix with the primary reflection which evidences the need to consider secondary reflections.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure, such as applying disclosed embodiments to ultrasound level sensing systems. In addition, while a particular feature may have been disclosed with respect to only one of several implementations, such feature may be combined with one or more other features of the other implementations as may be desired and advantageous for any given or particular application.

The invention claimed is:

1. A method of simulating a pulsed radar gauge (PRG) including a transceiver coupled by a process connection to a probe installed on a tank, comprising:
    providing an echo simulation algorithm including (i) a parametrized model of an echo reflection of a pulsed radar gauge responsive to a transmitted radar pulse launched into said tank defined by an initial spatial model function with function parameters provided by a user, including a signal amplitude as a function of distance a width and a spatial attenuation, a first signal model comprising a damping factor modeling said radar pulse traveling through each media in its signal path and a second signal model modeling a magnitude of a transmission and a magnitude of a reflection of said radar pulse striking boundaries involving said media (media boundaries) and (ii) an echo curve calculation (ECC) program; and
    using a processor running said ECC program, said ECC program:

dividing said signal path into a plurality of signal path components for said transmitted radar pulse using said first signal model together with said second signal model as a recursive executing program with stop conditions which whenever one of said stop conditions is reached provides an end result for ones of said plurality of signal path components that for reflected signals that reach said transceiver taken together include locations of reflections and their respective amplitudes, placing a shape of said initial spatial model function at each of said locations of reflections using said respective amplitudes applied to size their amplitude to generate a simulated echo curve, and overlaying said simulated echo curve on an actual echo curve obtained by a PRG in order to provide a visual aid and allow a user to determine if the PRG is functioning properly.

2. The method of claim 1, wherein said initial spatial model function comprises a damped sine function, a damped cosine function, or a Gaussian function.

3. The method of claim 1, wherein said damping factor comprises an exponential decay in said signal amplitude.

4. The method of claim 1, wherein said media boundaries are modelled using Fresnel equations which are functions of a dielectric constant (DC) on respective sides of each of said media boundaries.

5. The method of claim 1, wherein said stop conditions include whether said signal amplitude is <minimum signal level threshold, whether a current one of said media is a first media, and whether said current one of said media is a last media.

6. The method of claim 1, wherein said processor is part of a computing device separate from said PRG.

7. The method of claim 1, wherein said method is implemented in real-time in a transmitter of said transceiver and wherein said method is used for online/real-time diagnostics.

8. The method of claim 1, wherein said PRG comprises a guided wave radar (GWR) level gauge.

9. A computing device, comprising:

a processor having associated memory storing an echo simulation algorithm including a (i) a parametrized model of an echo reflection of a pulsed radar gauge responsive to a transmitted radar pulse launched by a pulsed radar gauge (PRG) including a transceiver coupled by a process connection to a probe installed on a tank into said tank defined by an initial spatial model function with function parameters provided by a user, including a signal amplitude as a function of distance, a width and a spatial attenuation, a first signal model comprising a damping factor modeling said radar pulse traveling through each media in its signal path, and a second signal model modeling a magnitude of a transmission and a magnitude of a reflection of said radar pulse striking boundaries involving said media (media boundaries), and (ii) an echo curve calculation (ECC) program, said ECC program:

dividing said signal path into a plurality of signal path components for said transmitted radar pulse using said first signal model together with said second signal model as a recursive executing program with stop conditions which whenever one of said stop conditions is reached provides an end result for ones of said plurality of signal path components that for reflected signals that reach said transceiver taken together include locations of reflections and their respective amplitudes, placing a shape of said initial spatial model function at each of said locations of reflections using said respective amplitudes applied to size their amplitude to generate a simulated echo curve, and overlaying said simulated echo curve on an actual echo curve obtained by a PRG in order to provide a visual aid and allow a user to determine if the PRG is functioning properly.

10. The computing device of claim 9, wherein said initial spatial model function comprises a damped sine function, a damped cosine function, or a Gaussian function.

11. The computing device of claim 9, wherein said damping factor comprises an exponential decay in said signal amplitude.

12. The computing device of claim 9, wherein said media boundaries are modelled using Fresnel equations which are functions of a dielectric constant (DC) on respective sides of each of said media boundaries.

13. The computing device of claim 9, wherein said stop conditions include whether said signal amplitude is <minimum signal level threshold, whether a current one of said media is a first media, and whether said current one of said media is a last media.

14. The computing device of claim 9, wherein said computing device is separate from said PRG and comprises a handheld computing device, tablet, or a laptop computer.

15. A computer program product, comprising:

a memory that includes program instructions executable by a processor to enable said processor to execute a method of simulating pulse echo curves of a pulsed radar gauge generated by a pulsed radar gauge (PRG) that includes a transceiver coupled by a process connection to a probe installed on a tank, said memory storing an echo simulation algorithm including (i) a parametrized model of an echo reflection responsive to a transmitted radar pulse launched by said pulsed radar gauge (PRG) into said tank defined by an initial spatial model function with function parameters provided by a user including a signal amplitude as a function of distance, a width and a spatial attenuation, a first signal model comprising a damping factor modeling said radar pulse traveling through each media in its signal path, and a second signal model modeling a magnitude of a transmission and a magnitude of a reflection of said radar pulse striking boundaries involving said media (media boundaries), and (ii) an echo curve calculation (ECC) program, said computer program product including ECC code including:

code for dividing said signal path into a plurality of signal path components for said transmitted radar pulse using said first signal model together with said second signal model as a recursive executing program with stop conditions which whenever one of said stop conditions is reached provides an end result for ones of said plurality of signal path components that taken together for reflected signals that reach said transceiver include locations of reflections and their respective amplitudes, code for placing a shape of said initial spatial model function at each of said locations of reflections using said respective amplitudes applied to size their amplitude to generate a simulated echo curve, and code for overlaying said simulated echo curve on an actual echo curve obtained by a PRG in order to provide a visual aid and allow a user to determine if the PRG is functioning properly.

16. The computer program product of claim 15, wherein said initial spatial model function comprises a damped sine function, a damped cosine function, or a Gaussian function.

17. The computer program product of claim 15, wherein said damping factor comprises an exponential decay in said signal amplitude.

18. The computer program product of claim 15, wherein said media boundaries are modelled using Fresnel equations which are functions of a dielectric constant (DC) on respective sides of each of said media boundaries.

19. The computer program product of claim 15, wherein said stop conditions include whether said signal amplitude is <minimum signal level threshold, whether a current one of said media is a first media, and whether said current one of said media is a last media.

* * * * *